United States Patent [19]

Lee

[11] Patent Number: 5,736,273

[45] Date of Patent: Apr. 7, 1998

[54] BATTERY SOCKET ASSEMBLY

[75] Inventor: Kyengjun Lee, Seoul, Rep. of Korea

[73] Assignee: Samsung Display Devices Co., Ltd., Kyungki-do, Rep. of Korea

[21] Appl. No.: 740,881

[22] Filed: Nov. 4, 1996

[30] Foreign Application Priority Data

May 15, 1996 [KR] Rep. of Korea ............ 96-11982

[51] Int. Cl.$^6$ ............................................. H01M 2/10
[52] U.S. Cl. ................................ 429/100; 429/96; 429/1
[58] Field of Search ............................ 429/1, 100, 96

[56] References Cited

U.S. PATENT DOCUMENTS 5,194,340   3/1993   Kosako .
5,431,575   7/1995   Engira .

Primary Examiner—John S. Maples
Attorney, Agent, or Firm—Christie, Parker & Hale, LLP

[57] ABSTRACT

Disclosed is a battery socket comprising an anode plate which is formed with a conductive plate, an insulator mounted between the anode plate and a cathode plate to prevent a short between the pole plates, which has a groove allowing a positive pole of the battery to pass through, and a cathode plate which is formed with a conductive plate and has a groove allowing the protruding portion (positive pole) to pass through and of which one side is contacted with the insulator and the other side is contacted with a flat portion (negative pole) of the battery. The cathode plate has a projecting plate for allowing easy contact with the flat portion (negative pole) of the battery. The anode plate has elastic members or a curve for relaxing the pressure when inserting the positive pole of the battery.

5 Claims, 3 Drawing Sheets

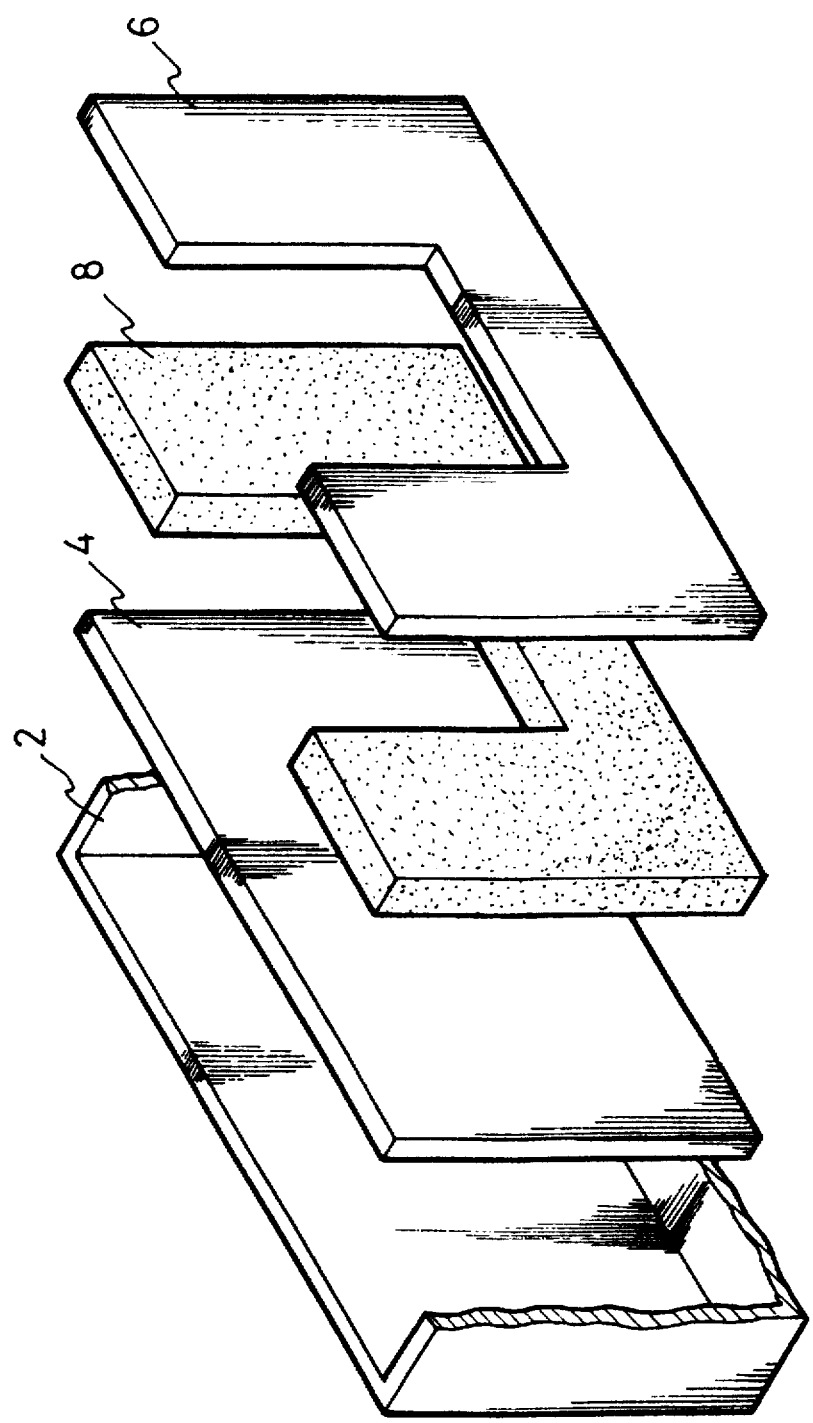

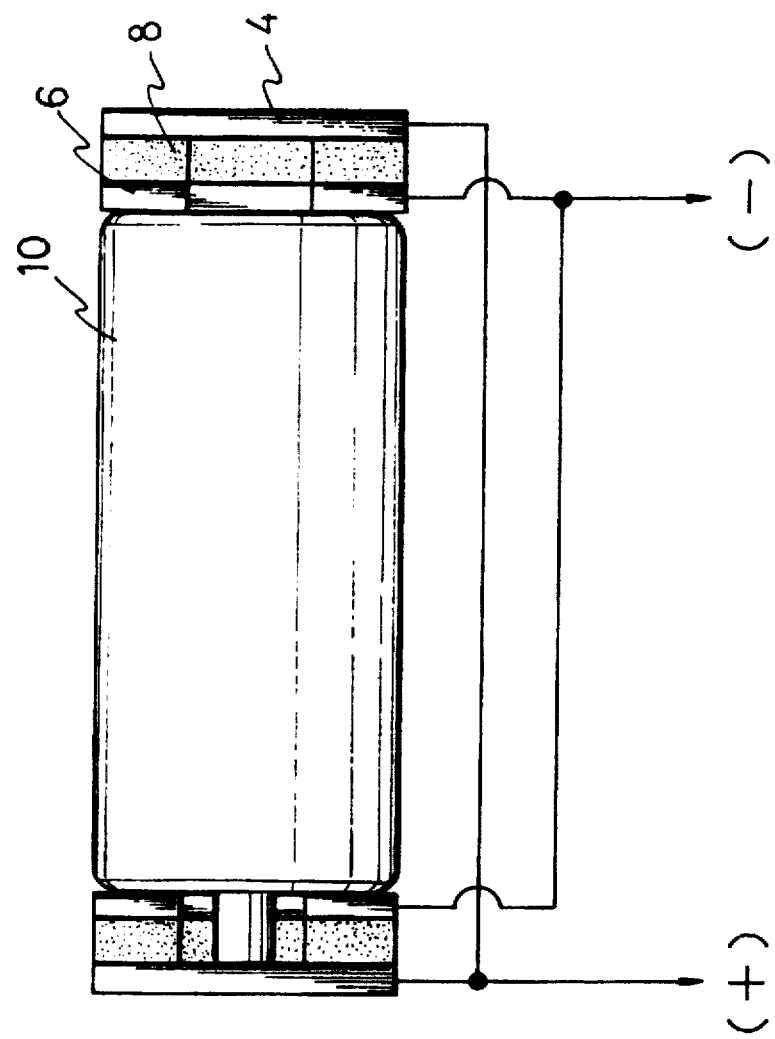

BATTERY SOCKET ASSEMBLY

BACKGROUND

The present invention relates to a battery socket assembly, and more particularly, to a battery socket assembly which prevents electrical shock to an electronic apparatus or a battery, and allows the electronic apparatus to operate regardless of the mounting direction of the battery.

Generally, battery socket assemblies are mounted inside a variety of electronic apparatuses and are used as a receptacle in which the battery is mounted for allowing electric power to be supplied to the electronic apparatus, enabling the use of an independent source of electricity and not power from the outside. Battery socket assemblies are placed in electronic apparatuses to allow the supplying of power especially to portable electronic apparatuses so that when they are used outdoors, where supplying power from an outside source is inconvenient and/or not possible, a user is still able to operate the electronic apparatus.

Battery socket assemblies are various in size and shape depending on the amount of electrical consumption of the electronic apparatus, the size of the apparatus, or the shape of the battery to be mounted. However, with regard to the structure of the battery socket assembly, only one type of structure is used in which the battery can be mounted in only one direction.

A conventional battery socket assembly comprises a battery barrel, having a size that corresponds to that of the battery or batteries to be insert; an anode plate fixed on one side of the battery barrel and to which only an anode of the battery is connected; and a cathode plate, fixed on the opposite side to the anode plate and to which only a cathode of the battery is connected. It is therefore possible only to mount the battery in one direction.

Whenever using such a battery socket assembly, the user must always ensure that the battery is mounted in the correct direction.

Also, if the battery is inserted incorrectly, the electronic apparatus does not operate, and it is possible for the battery in the electronic apparatus to be damaged by an electric shock.

SUMMARY OF THE INVENTION

The present invention has been made in an effort to solve such problems and its object is to provide a battery socket assembly which prevents an electrical shock to an electronic apparatus or a battery, and allows the electronic apparatus to operate regardless of the mounting direction of the battery.

To achieve the object, the present invention provides a battery socket assembly comprising an anode plate which is formed with a conductive plate; an insulator, mounted between the anode plate and a cathode plate to prevent a short between the pole plates, which has a groove allowing a positive pole of the battery to pass through; and a cathode plate which is formed with a conductive plate and has a groove allowing the protruding portion(positive pole) of the battery to pass through, one side of which is contacted with the insulator and the other side with a flat portion(negative pole) of the battery.

The cathode plate has a projecting plate for allowing easy contact with the flat portion(negative pole) of the battery.

The anode plate has elastic members or a curve for relaxing the pressure when inserting the protruding portion of the battery.

Since the battery socket assembly in accordance with the present invention has pole plates, one of which is an anode plate and the other a cathode plate, a groove is formed in the cathode plate allowing the protruding portion(positive pole) of the battery to pass through, thereby allowing each polarity of the battery to be contacted with the corresponding polarity of the pole plate. Through this structure, the electronic apparatus can be operated regardless of the mounting direction of the battery.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is an exploded perspective view showing a pole plate structure of a battery socket in accordance with the present invention;

FIG. 2 is a block diagram showing a state in which the battery is inserted in the battery socket in accordance with the present invention;

DESCRIPTION

Figure 3A:
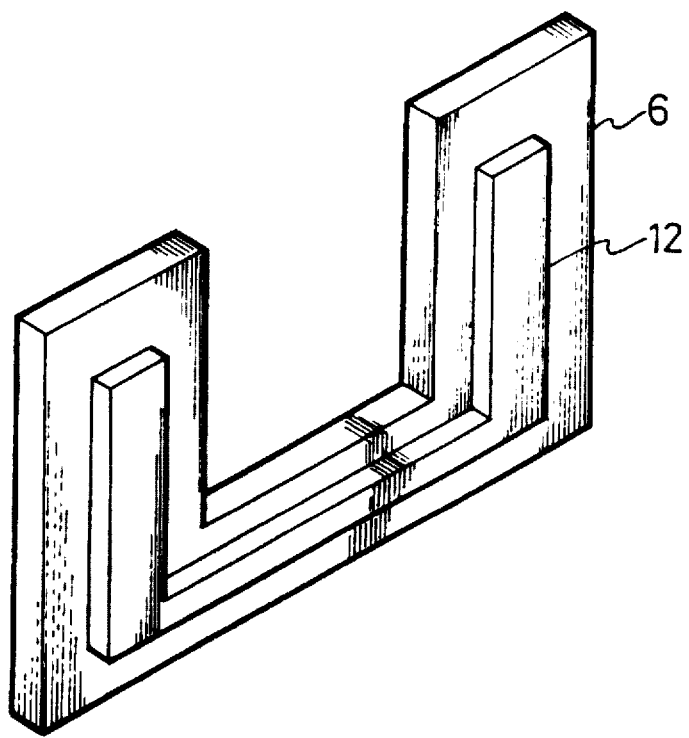
FIG. 3A is a partially sectional view showing a projecting plate formed on a cathode plate of the battery socket in accordance with another preferred embodiment of the present invention.

Preferred embodiments of the present invention will now be described in detailed with reference to the accompanying drawings.

FIG. 1 is an exploded perspective view showing a structure of an anode plate 4 and a cathode plate 6 in a battery barrel 2 of a battery socket assembly in accordance with the present invention.

The anode plate 4 and the cathode plate 6 are mounted on one side end of the battery barrel 2, and an insulator 8 is disposed between both pole plates 4 and 6.

The battery barrel 2 in which a battery 10 is inserted is integrally formed with a body(not shown) of an electronic apparatus, and its size can be changed according to the size of the battery 10. Further, the battery barrel 2 has a cover(not shown) for preventing the detachment of the battery 10 from the battery barrel 2.

The anode plate 4, the insulator 8, and the cathode plate 6 are mounted in this order from a far outer side of the battery barrel 2, and the anode plate 4, which is formed with a plate similar in size to that of one side of the battery barrel 2 is contacted with a protruding portion(positive pole) of the battery 10 when the protruding portion thereof is directed to this side.

The cathode plate 6 has a section which is open to allow the protruding portion of the battery 10 to be contacted with the anode plate 4, and when a flat portion(negative pole) of the battery 10 is placed on this side of the battery barrel 2, it comes into contact with only the cathode plate 4.

The insulator 8 is disposed between the anode plate 6 and the cathode plate 8 to prevent a short therebetween, and also has a section which is open to allow the protruding portion (positive pole) of the battery 10 to be contacted with the anode plate 4.

The above-described structure of the battery socket is applied to both sides of the battery barrel.

FIG. 3A is a perspective view showing another preferred embodiment in accordance with the present invention.

A projecting plate 12 is formed on a front side of the cathode plate 6 to allow easy contact with a flat end(negative pole) of the battery 10.

Figure 3B:
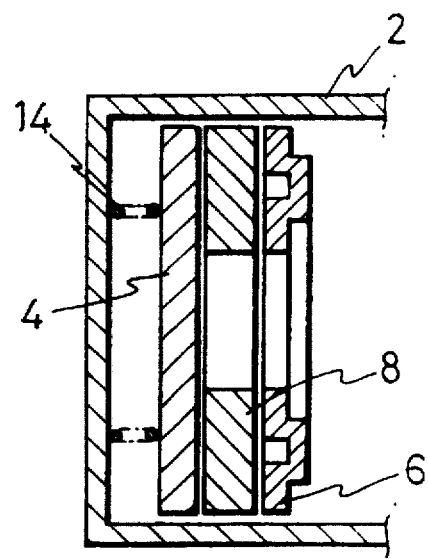
FIG. 3B is a partially sectional view showing a mounting state of an elastic member in the battery socket assembly in accordance with another preferred embodiment of the present invention.

FIG. 3B is a partially sectional view of another preferred embodiment of the present invention showing a mounting state of an elastic member 14 between the battery barrel 2 and the anode plate 4.

To ease the pressure when inserting the protruding portion of the battery, the elastic member 14 is mounted or a curve is formed in the back of the anode plate 4(in the space between the battery barrel and the anode plate).

The battery socket assembly in accordance with the present invention, as shown in FIG. 2, comprises the anode plate 4 mounted on the far outer side of the battery barrel, the cathode plate 6 mounted on the most inner side thereof, and the insulator 8 mounted between the anode plate 4 and the cathode plate 6 to prevent a short there-between. Both the cathode plate 6 and the insulator 8 have an open section through which the protruding portion(positive pole) of the battery 10 is contacted with the anode plate 4 when mounting the battery.

By using such a battery socket assembly, the anode plate 4 is always contacted with the protruding portion(positive pole) of the battery 10, and the cathode plate 6 is always contacted with the flat portion(negative pole) of the battery 10, regardless of the mounting direction thereof.

Accordingly, the electronic apparatus can be operated regardless of the mounting direction of the battery 10 since one polarity is contacted with only one side.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. A battery socket assembly for receiving a battery having a protruding positive pole and a flat negative pole, the battery socket assembly comprising:
   a battery barrel having an end;
   an anode plate positioned at the end of the battery barrel;
   a cathode plate spaced apart from the anode plate, said cathode plate having a surface for contacting the flat negative pole of the battery, and a groove for passing the protruding positive pole of the battery to the anode plate; and
   an insulator disposed between and contacting both the anode plate and the cathode plate, said insulator having a groove for passing the protruding positive pole of the battery to the anode plate.

2. The battery socket of claim of claim 1 wherein said cathode plate comprises a projecting plate for contacting the flat negative pole of the battery.

3. The battery socket of claim 1 further comprising an elastic member for mounting the anode plate to the end of the battery barrel.

4. The battery socket of claim 1 wherein said battery barrel further comprises an opposing end, further comprising:
   a second anode plate positioned at the opposing end of the battery barrel;
   a second cathode plate spaced apart from the second anode plate, said second cathode plate having a surface for contacting the flat negative pole of the battery, and a groove for passing the protruding positive pole of the battery to the second anode plate; and
   an second insulator disposed between and contacting both the second anode plate and the second cathode plate, said second insulator having a groove for passing the protruding positive pole of the battery to the second anode plate.

5. The battery socket of claim 4 further comprising a battery having a protruding positive pole contacting said anode plate, and a flat negative pole contacting said second cathode plate.

* * * * *